United States Patent
Lang et al.

(10) Patent No.: US 7,142,098 B2
(45) Date of Patent: Nov. 28, 2006

(54) WIRELESS DATA TRANSFER SYSTEM FOR A TRACTOR-TRAILER

(75) Inventors: Heinrich Lang, Ergersheim (DE); Jorg Scholler, Ergersheim (DE); Michael Witzke, Ansbacheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 235 days.

(21) Appl. No.: 10/843,144

(22) Filed: May 11, 2004

(65) Prior Publication Data

US 2005/0062590 A1      Mar. 24, 2005

(30) Foreign Application Priority Data

Sep. 5, 2003    (DE)    ................. 103 41 067

(51) Int. Cl.
    *G08B 21/00*    (2006.01)
(52) U.S. Cl. ............... 340/431; 340/506; 340/531; 340/815.4
(58) Field of Classification Search ............... 340/431, 340/435, 539.1, 539.22–539.25, 932.2, 506, 340/514, 815.4, 531; 359/838
    See application file for complete search history.

(56) References Cited

U.S. PATENT DOCUMENTS

| | | | | |
|---|---|---|---|---|
| 5,303,205 A | * | 4/1994 | Gauthier et al. | 367/108 |
| 5,831,519 A | * | 11/1998 | Pedersen et al. | 340/431 |
| 5,900,803 A | * | 5/1999 | Politz et al. | 340/425.5 |
| 5,905,433 A | * | 5/1999 | Wortham | 340/431 |
| 6,445,287 B1 | * | 9/2002 | Schofield et al. | 340/442 |
| 6,501,376 B1 | * | 12/2002 | Dieckmann et al. | 340/431 |
| 6,592,230 B1 | * | 7/2003 | Dupay | 359/838 |

FOREIGN PATENT DOCUMENTS

| | | |
|---|---|---|
| DE | 34 17 956 C2 | 11/1985 |
| DE | 38 42 484 A1 | 6/1990 |
| DE | 196 20 555 A1 | 11/1997 |
| DE | 100 33 345 A1 | 1/2002 |
| DE | 100 44 034 A1 | 4/2002 |
| DE | 101 12 715 A1 | 9/2002 |
| DE | 102 25 160 A1 | 12/2003 |
| EP | 0 793 838 B1 | 3/2000 |

* cited by examiner

*Primary Examiner*—Thomas Mullen
(74) *Attorney, Agent, or Firm*—McNair Law Firm, P.A.

(57) ABSTRACT

A means of wireless data transmission between a tractor and a trailer using a data transfer system having a first communication unit that is installed on the front of the trailer and a second communication unit that is installed on the rear of the tractor cab. Both communication units on a coupled tractor-trailer are located facing each other across a hitching space between the tractor and trailer to define a communication gap over which data is wirelessly transmitted. A notification device is carried by the tractor and operatively connected to the second communication unit. At least one data collector is carried by the trailer and operatively connected to the first communication unit. Accordingly, the driver is provided with information through the notification device from the data collector by way of the first and second communication unit, which wirelessly transmit the data between the tractor and trailer.

13 Claims, 2 Drawing Sheets

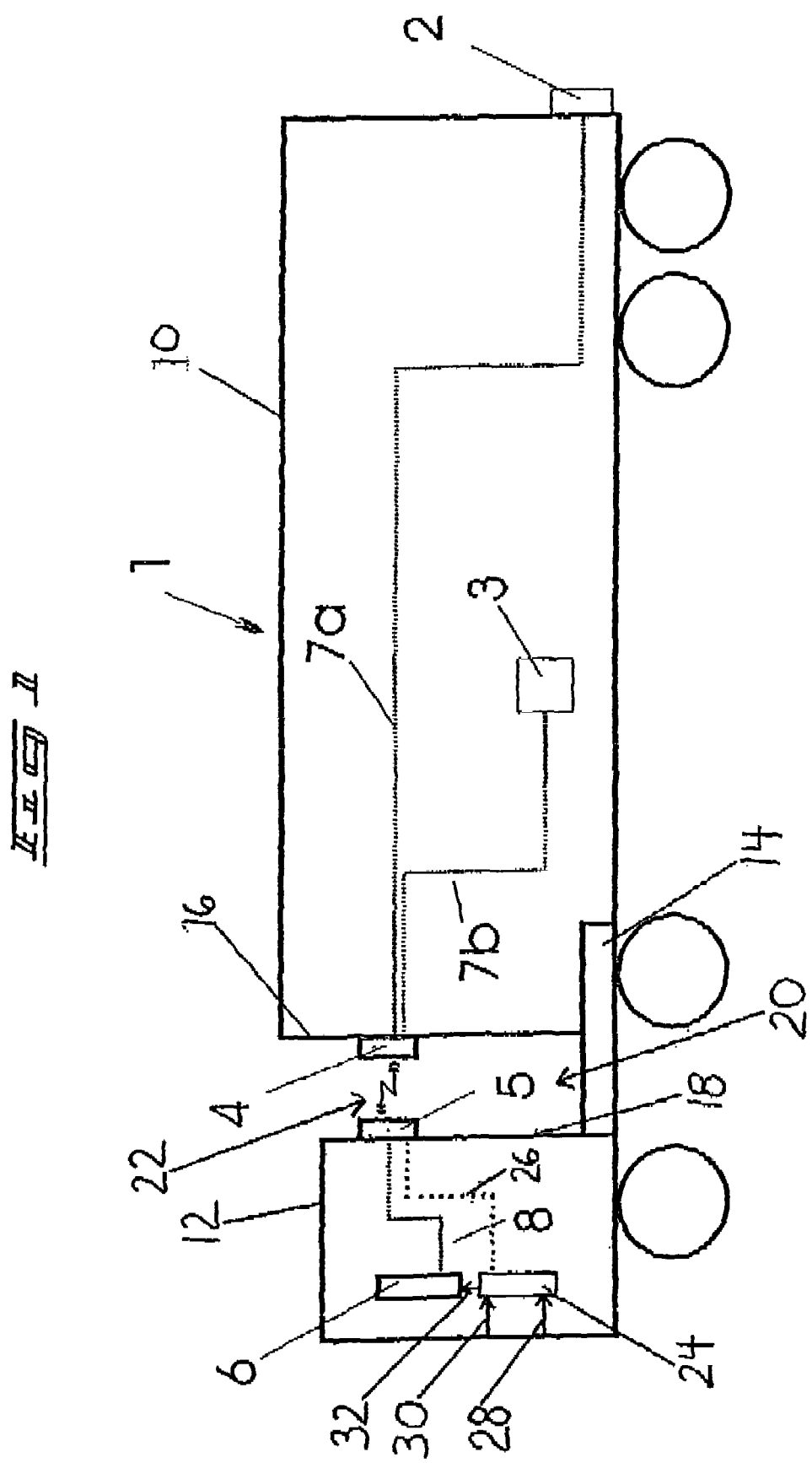

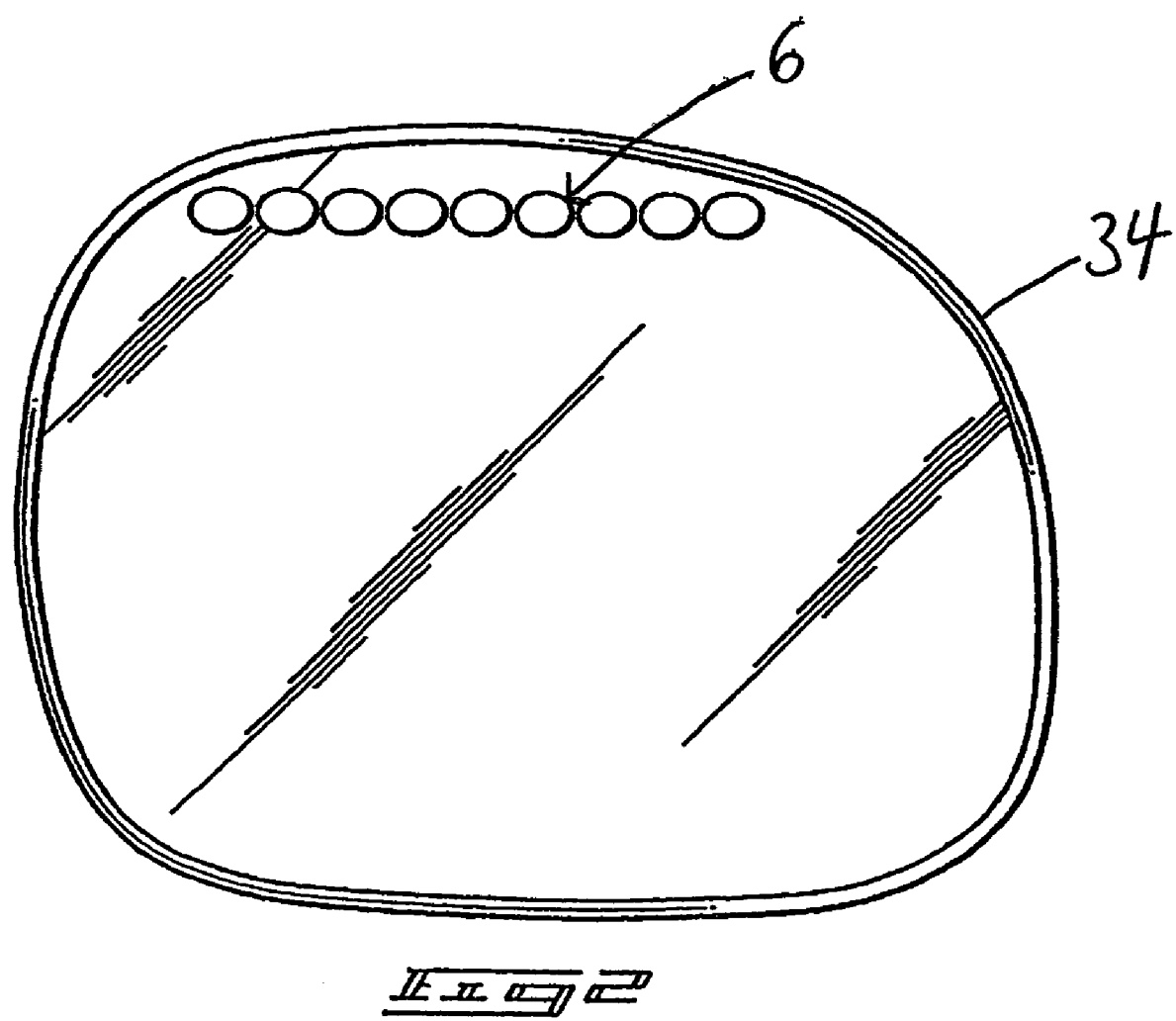

WIRELESS DATA TRANSFER SYSTEM FOR A TRACTOR-TRAILER

FIELD OF THE INVENTION

The present invention relates to tractor-trailer vehicles and the transfer of data between the tractor and trailer to assist the driver in operating the vehicle. More particularly, the invention relates to a wireless data transfer system having first and second wireless communication units carried across a hitch space between the rear of a tractor cab and the front of the trailer for wirelessly transmitting data from sensors in the trailer across the hitch space to a notification device in the tractor, which eliminates connection wires to simplify hitching and unhitching between the tractor and trailer, and, as described herein below, results in rapid and secure data transfer.

BACKGROUND OF THE INVENTION

Basic data transfer systems for transmitting information between a pulling vehicle and a trailer are known. Typically, these systems include data collectors at the rear of the vehicle and a notification device in view of a driver in the cab. The data collection mechanisms typically include various sensors for interacting with the notification device. Signals generated by the sensors are then capable of notifying the driver of a situation behind the vehicle. The sensors may typically include radar mechanisms, cameras, ultrasonic and infrared sensors, which signal the notification device in order to notify the driver about various conditions in and around the vehicle cab and trailer. For example, in the case of the camera, the signal generated by the camera is transmitted to a display screen included in the notification device or, in the case of the radar mechanism, to an acoustic warning device in the cab. Using such a system, the driver of a large tractor trailer can be assisted when backing up, such as in parking, and can avoid a collision with any obstacle, such as a parked vehicle.

With such a data transfer system as described above, a connection between the notification device in the tractor and the data collector in the trailer is established by wires running through the vehicle. However, a problem arises in that a connection must be provided between the notification device and the data collector that can be disconnected, enabling the trailer to be unhooked or traded to a different pulling vehicle.

Attempting to avoid the above noted problem, German utility patent 201 10 339.7 describes a parking assistance system in which data about obstacles behind the vehicle is collected by sensor and broadcast via radio communication to the notification device near the driver, thereby facilitating simpler hitching and unhitching by eliminating the connection of wires between the tractor and trailer.

However, there are several new problems that arise with this system. In the case of a commercial sized tractor-trailer, the transmission path necessary to transfer the data from the data collector in the rear of the trailer to the notification device in the cab is relatively large, requiring a relatively strong radio signal. This strong radio signal can then disturb similar equipment that is insufficiently shielded. Accordingly, a trucking company that operates several trucks with this equipment must pay special attention that the equipment in a specific tractor-trailer communicates only with itself and does not interfere with the equipment of another tractor-trailer in the fleet. For this reason, the system must have a distinct identifier and it must be secured, such as by encoding the signals, so that the respective transmitting device only communicates with the corresponding receiver in the same truck. Thus, each pair of transmitters and receivers requires specific codes or protocols that are either programmed in advance or are "defined" at transmission. This increases the complexity of these devices and diminishes the data transfer rate that is utilizable in the transfer of images or other sensor information because a part of the data transfer has to be used for the required encoding overhead.

Additionally, as a matter of some logistics, it is preferable in a modern fleet of trucks to at any time provide other information concerning the trailer being towed, such as data about the load, temperature in a refrigeration unit, the destination, and the maintenance of the trailer, as opposed to just a picture of the lane behind the trailer.

Accordingly, it is an object of the present invention to provide a data transfer system for use in a tractor-trailer in which a variety of data can be wirelessly transferred from sensors in the trailer across the hitching space to a notification device in the tractor, which can assist the driver in operation of the vehicle.

It is another object of the present invention to position the wireless transmission devices as closely as possible to each other across the hitching space to simplify data transmission and reduce signal strength to enable only a minor overhead of protocol data for increased transmission rate with reduced interference to other similar systems.

SUMMARY OF THE INVENTION

The above objectives are accomplished according to the present invention by providing means of wireless transmission of data between a tractor and a trailer using a data transfer system having a first communication unit that is installed on the front side of a trailer and a second communication unit that is installed on the rear side of a tractor cab. Both communication units on a coupled tractor and trailer are located across the hitching space between the tractor and trailer, which defines a communication gap over which data is wirelessly transmitted between the units. Advantageously, the first and second communication units are faced towards each other which helps to reduce the signal strength necessary to communicate data across the communication gap. A notification device is carried by the tractor and operatively connected to the second communication unit. At least one data collector is carried by the trailer and operatively connected to the first communication unit. The communication units include various transmitter and receiver components capable of unidirectional or bi-directional data transmission between the tractor and trailer. Accordingly, the driver is provided with information through the notification device from the at least one data collector by way of the first and second communication units, which wirelessly transmit the data between the tractor and trailer.

Because the communication units are turned to face each other and the wireless signal only has to surpass a short distance as the units are only spaced across the hitching space between the rear of the tractor and the front of the trailer, a lower sending capacity is needed to provide a sufficient signal level to send the signal between the first and second communication units. This lower signal strength provides a safeguard against cross talk with other similar systems of other trucks. Additionally, the structure of the tractor-trailer itself shields the low strength signal from generally traveling beyond the truck to eliminate the possibility of a disruption of other identical equipment.

Since the transfer of the signals between the tractor and trailer is conducted wirelessly, no connection between the communication units in the tractor and trailer is necessary. As a result, a modular design is provided that may be easily retrofitted to various tractor-trailer vehicles since no connection of wires between the tractor and trailer is required. In this way, the disconnection or exchange of the tractor and trailer is simplified. The modular nature of the invention also provides for ease of replacement and adjustment.

While the communication units communicate wirelessly, the data collectors and notification device are linked by wires to their respective communication unit. Using set wiring inside the tractor-trailer, signals can reliably be transferred, without interruption and with low energy expenditure, between the data collectors and notification device and their respective communication unit.

In operation, the driver is directly support his job by the transfer of detailed information between the tractor and trailer. For example, a picture transfer from cameras at the back of the vehicle or, in the case of a freezer semi-trailer, about the temperature changes inside of the trailer's refrigerator, or similar details relevant to the load, such as the destination of the load, can be displayed on the notification device and brought to the driver's attention. Preferably, in order to avoid a disruption of identical equipment, the respective communication units are arranged in such a way that they are positioned in a face-to-face arrangement across the hitching space. The required signal strength necessary to successfully and reliably complete data transfer across the communication gap then becomes so low that a plurality of identical equipment can work right next to each other without influencing each other. Advantageously, this low signal strength eliminates the need for special encoding for each unit, thereby dramatically increasing data transfer rates and processing of the information for use by the driver.

The data transfer can be communicated in a unidirectional or bidirectional manner as desired. It is typically more advantageous to transfer signals bi-directionally between the first and second communication units. For example, a control signal can be sent to the data collectors in the trailer that stimulates the data collectors to begin sending signals back to the notification device through the communication units when the driver starts the engine. Furthermore, through a two-way-transfer, transfer mistakes can be more simply detected and corrected, or only particular data can be asked for on demand. For example, it is possible to transmit images taken by a camera at the end of the truck via infrared interface between the tractor and trailer only when the driver puts the truck in reverse. In this case, for example, the engagement of the reversing gear is an event that is reported to a control unit which receives an input, typically an electrical signal from an onboard computer of the tractor, identifying that the tractor has been placed in reverse. The control unit automatically generates a control signal, which is transmitted either directly, or indirectly by way of the notification device or other signaling device, to the second communication unit, which is then instructed to transmit to the first communication unit and data collectors on the trailer. The control signal may then, for example, activate the cameras in the back of the trailer and use the transfer capacity of the system for transferring images to the notification device to assist the driver.

On the other hand, a unidirectional transmission can suffice with simple tasks. An advantage of a tractor-trailer with unidirectional transmission lies in the cost efficient design of the communication units since dual sending and receiving mechanism can be left out.

According to a preferred embodiment of the invention, the communication units of the tractor-trailer communicate through infrared signals (or alternatively using, laser, radio, blue tooth, WiFi, etc.). The communication units are aligned facing each other across the gap between the tractor-trailer so that communication between both sides is possible in generally every driving situation. Further, the infrared signals are at the same time shielded by the structure of the tractor-trailer from other transmission equipment that does not belong to the tractor-trailer.

Through modulation of the infrared signals, a large amount of data can be transferred at a greater rate. Also, shielding or guidance of the infrared rays can be obtained by simple means, so that a reaction does not take place between the data senders and receptors of another truck with identical wireless transfer equipment. Infrared sending and receiving units may be also mounted in such a way that the unit carried by the tractor and the unit carried by the trailer have intervisibility to each other as long as the trailer is attached to the tractor. Further, they are likely to be mounted in places that are not able to be directly reached by outside rays.

A disruption from other units outside the system is avoided because the tractor and trailer, which are impermeable by infrared rays, simply block a large part of the signals that are sent from other identically assembled equipment. Furthermore, the unblocked signals from other tractor-trailers are so weak that they have no effect and, thus no further shielding of the communication units is necessary. Advantageously, identical wireless systems can be used by several tractor-trailers standing next to each other. Additionally, when two trailers are exchanged, there is still no readjustment of the wireless system because every data sender can communicate with every data receptor without reprogramming. This simplifies the construction and exchange of the mechanisms, which is important for maintenance and external programming.

According to a further preferable design form, the notification device is placed in or on a driver's cab in plain view of the driver. The instruction to the driver through the appropriate mechanism can result from different notification devices, such as acoustic devices, or in special cases, possibly haptic devices. For the highest concentration of information possible, an optical display is often favored. In this case, it is reasonable to set a notification device such as a picture screen at least at the edge of the driver's sight, or alternatively, in a heads-up-display in the windshield.

According to a further preferable design form, the first communication unit in the trailer is connected effectively with at least one data collector via wires. In the same way, the second communication units in the tractor is connected by wires to the notification device. Through the wired connection between data collectors and communication units, the data transmission between the mechanisms joined by wires can occur largely without disruption and with very low energy expenditure. Furthermore, the transmission in wires inside the trailer, as well as the tractor does not cause a disruption to identical equipment used in parallel systems within the tractor-trailer of those in close proximity.

According to a further preferable design form, the notification device, data collectors, and the communication units are detachably installed on the tractor-trailer, making them easily exchangeable. In addition, the detachable units allow for simple retrofitting of other tractor-trailers.

According to a further preferable design form, the wireless data transfer system accomplishes a self-diagnosis on the basis of a detection signal transferred between the communication units which tests for proper operation. As the data transfer in the wireless system can degrade as a result of outside conditions, such as pollution, the driver is informed that the data transfer system no longer functions reliably and appropriate corrective action is requires, such as cleaning or exchanging the communication units.

In a further preferred embodiment of the invention, a control unit is provided for generating a control signal in response to an input that can be transmitted between the communication units to the data collectors in order to control and/or program the data collector for various operations. In such an embodiment, the data collector can be activated, programmed, or otherwise controlled manually to perform a specific function, return specific information, or operate automatically, for example, through functions available to the driver in the notification device or as the result of an automatic event which produces an input to the control unit, such as place the tractor in reverse, as noted above. Furthermore, a wireless programming device is conceivable that would send signals from outside the tractor-trailer to calibrate the wireless system, and/or possibly supply data to the notification device concerning the load in the trailer.

According to a further preferable design form, the controlling, or as the case may be, programming of the data collectors is carried out manually and/or automatically. A manual programming enables a more flexible input of data directly to the vehicle, for example, in order to adjust the data relating to cargo, activated a specific sensor, and the like. On the other hand, an automatic control and/or programming, would allow for data from a firm network to be retrieved, or a specific sensor to be activated in response to an event as noted above, as just a few examples. In the latter, transfer mistakes in typing will be avoided, as well as eliminating the need for an input device to be used by the driver.

According to a further preferable design form, the transfer of the data between both the communication units will be carried out through analogue or digital signals. The data to be transferred is normally encoded through modulation during the transfer. Appropriate analogous or digital modulation procedures that can be used with the invention are state-of-the-art, adequate and familiar and are not described here any further.

According to a further preferable design form, the data collectors of the tractor-trailer consist of a variety of sensor mechanism. As previously explained, the data collectors can collect various details using various types of sensors, such as the situation behind the trailer using a camera, important parameters involving the load, such as the temperature inside a cooler vehicle, and can relate data either periodically or on demand via the communication units to the notification device. For example, via the steering mechanism, it can be initiated that the sensor mechanisms in the trailer are activated. Also, a camera attached at the back of a tractor-trailer can be activated, swiveled, or its optics can be focused if the driver keys a signal into an appropriately equipped receptor or, as the case may be, notification device.

Depending on the type of signals transferred between the tractor and trailer, different mechanisms may be activated. In the transfer of information concerning hindrances behind the vehicle, for example, a visual display can be useful and shown on the notification device. Alternately or in addition, however, an acoustic warning or a palpable haptic vibration in the steering wheel may be used if a there is not at least a minimum distance between the end of the vehicle and an object. Finally, a simpler optical display such as a text display or a warning light, depending on the importance and precision of the information, can be optimally placed within the ergonomic line of sight of the driver. It should also be noted that the way in which information is displayed to the driver (i.e. by way of a monitor, a flashing light, an acoustic alert, etc.) can be chosen according to the importance of the information, for example an acoustic alert might be used for collision warnings, as well as certain ergonomic viewpoints, such as whether the information is displayed in a way that it immediately attracts attention or in a way that it may be controlled if the driver feels the necessity (i.e. text displaying temperature of the trailer).

According to a further preferable design form, the notification device is integrated into or attached onto a rear-view mirror of the vehicle. This is especially useful when the data collectors consist of sensors to recognize hindrances behind the vehicle. It is advisable that the notification device is attached near the rear-view minor that the driver uses on a regular basis for backing up. In this way, all the information relevant for the driver is always in his sight.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 shows a schematic of the wireless data transfer system on a couple tractor-trailer according to the invention; and, FIG. 2 shows a rear view mirror incorporating a notification device according to the invention.

Although a commercial sized tractor-tractor vehicle is portrayed in the diagram, the wireless data transfer system according to the invention can be applied to other vehicles capable of pulling a trailer, such as a regular four-wheeled vehicle with a trailer. Accordingly, the terms in the following description are applicable to all variety of pulling vehicle and trailer.

DETAILED DESCRIPTION OF A PREFERRED EMBODIMENT

With reference to FIG. 1, the invention will now be described in more detail. The reference number 1 refers to a commercial tractor-trailer vehicle. The reference numbers 2 and 3 refer to different data collectors. The reference numbers 4 and 5 refer to first and second communication units, respectively. The reference number 6 refers to a notification device. Reference numbers 7a and 7b refer to wired data transfer connections, such as electric or fiber optic cables, that are installed in the trailer that connect first communication unit 4 with data collectors 2 and 3. Reference number 8 refers to a wired data transfer connection, such as electric or fiber optic cables, that are installed in the tractor that connect second communication unit 5 with notification device 6. Reference number 10 refers to a trailer of the vehicle. Reference number 12 refers to a tractor cab of the vehicle. Reference number 14 refers to a trailer hitch coupling the tractor to the trailer. Reference number 16 refers to a front side of the trailer. Reference number 18 refers to a rear side of the tractor cab. Reference number 20 refers to a hitching space between the rear of the tractor cab and front of the trailer. Reference number 22 refers to a communication gap between the first and second communication units. Reference number 24 refers to a control unit. Reference number 26 refers to a wired data transfer connection, such as electric or fiber optic cables, that are installed in the tractor that connect second communication unit 5 with control unit 24. Reference number 28 refers to a manual input to control unit 24 for generating a control signal indicated by reference number 32. Reference number 30 refers to an automatic input to control unit 24 for generating control signal 32.

Data collector 2, which may be a distance sensor, camera, or the like, serves to register the situation behind the vehicle 1, particularly the areas not visible to the driver in rearview mirrors. It is assembled on the rear of the vehicle 1.

Data collector 3, on the other hand, is intended to provide information relating to trailer 10 and its load. For example, data collector 3 can be a temperature sensor located inside the trailer that can inform the driver about load relevant parameters in the trailer. It is also possible to have a transfer of further safety information, such as monitoring of the tire pressure.

Both data collectors 2 and 3 are connected by wires 7a and 7b to first communication unit 4. The wires can be preinstalled during factory construction of the trailer or retrofitted later to ensure a simple and interruption-free transport of the data from the data collectors to fist communication unit 4.

Preferably, first communication unit 4 and data collectors 2 and 3 are connected by detachable connectors to wires 7a and 7b that lie in the trailer. In this way, a safe and energy efficient connection can be achieved that does not disturb other wireless systems in neighboring vehicles. At the same time, a simple exchange of first communication unit 4 and data collectors 2 and 3 is made possible through well-known plug and socket connectors. Furthermore, such plug and socket connectors can be adapted to allow for simple modular expansions without the original installed units needing to be exchanged.

In the same manner, second communication unit 5 on tractor cab 12 is connected to notification device 6 by a cable 8. Notification device 6 is assembled in or on tractor cab 12 of vehicle 1 and separated from first communication unit 4 and data collectors 2 and 3. Also, the second communication unit 5 and notification device 6 are connected by detachable connectors to wire 8 to allow for safe installation and simple exchangeability, which does not disturb wireless systems in other trucks.

Both communication units 4 and 5, on a coupled tractor and trailer, are located across hitching space 20 between the tractor and trailer, as illustrated. The tractor and trailer are coupled together by trailer hitch 14, as is well known in the art, to provide relative pivotal movement between the tractor and trailer for turning. First communication unit 4 is carried on an exterior front side 16 of trailer 10, and second communication unit 5 is carried on an exterior rear side 18 of tractor cab 12 to define a communication gap 22 between the two communication units. Preferably, they are further aligned faced towards each other. Because communication units 4 and 5 are turned to face each other, the wireless signal only has to surpass a short distance as the units are only separated by hitching space 20, and a lower sending capacity is thereby required to provide a sufficient signal level to send the signal between the first and second communication units. This lower signal strength provides a safeguard against cross talk with other similar systems of other trucks. Additionally, the structure of the tractor-trailer itself shields the low strength signal from generally traveling beyond the truck to eliminate the possibility of a disruption of other identical equipment.

Accordingly, data from trailer 10 is transferred from data collectors 2 and 3 by wires 7a, 7b and first communication unit 4 to second communication unit 5 on tractor cab 12 and then further on to notification device 6 via cable 8, where the data is converted into information usable by the driver.

As noted above, since the senders and receptors in the first and second communication units are arranged in such a way that only slight transfer emission is necessary, they are not disturbed by other similar assemblies in nearby trucks as the signals are too weak. The senders and receptors are further turned to each other and largely shielded by the structure of the tractor-trailer against outside influences.

In operation, notification device 6 advises the driver about a situation behind the vehicle that is detected by data collector 2 when a signal announcing the situation behind the vehicle is transmitted from data collector 2 or requested by the driver, as through a control unit operatively associated with notification device 6.

Preferably, data collector 2 comprises a sensor mechanism, such as a video camera, a radar sensor, an ultrasound sensor, or an infrared sensor. These various sensors may further include control units for the operation of the senor and sending of information to notification device 6. Furthermore, notification device 6 preferably comprises a visual displaying mechanism, such as an LED or other video display, and/or an acoustic warning mechanism, and/or a haptic warning mechanism. Preferably, as illustrated in FIG. 2, the displaying unit of notification device 6 can be integrated into or assembled onto a rear-view mirror 34 of the vehicle. Alternatively, in another embodiment, the displaying unit of notification device 6 can be integrated into or assembled as a heads-up-display in the driver's windshield.

In the case of the video camera, picture signals that report the situation behind the vehicle 1 can be transmitted wirelessly between the trailer and the tractor and be displayed on the picture displaying mechanism. In this way, the driver is notified of the situation behind the vehicle and thus of any potential accident situation when backing up and otherwise maneuvering the vehicle.

In the case of the radar sensor, the ultrasound sensor, or the infrared sensor, a certain area behind the vehicle can be scanned by these sensors. If a hindrance is present in this certain area, the sensor in data collector 2 sends a signal through wire 7a to first communication unit 4, which then wirelessly transmits the data to second communication unit 5, which then passes on the information via wire 8 to notification device 6. Accordingly, the driver is informed as to the situation behind the vehicle 1 and any accident in backing up can be avoided.

Furthermore, the possibility exists that, in addition to the transmission of signals from data collectors 2 and 3 to the notification device 6, a control signal 32 can be wirelessly transmitted back to data collectors 2 and 3 to actuate the data collectors. Such signals can be used to manually and/or automatically control and/or program one of a plurality of the data collectors to provide information to the driver. In the preferred embodiment, control signal 32 is generated by control unit 24 in response to an input event. The input event may be a manual input 28, such as a switch operated by the driver to actuate a specific data collector, or an automatic input 30, such as placing the tractor in reverse which actuates specific data collector. Control unit 24 recognizes the input event and transmits control signal 32 to the data collector. As illustrated in FIG. 1, control signal 32 may be transmitted directly to second communication unit 5 by wire 26 for transmission to the data collectors as described above, or sent indirectly through notification device 6 or other signaling device, as the case may be for a desired installation of the components of the system. For example, a driver may manually operate a switch which produces input signal 28 to control unit 24. The control unit then sends a control signal 32 to notification device 6, which further transmits the control signal via the communication units to a video camera represented by data collector 2 which actuates the video camera to return images to the notification device. Alternatively, sensors in data collectors 2 and 3 can begin automatic operation when the driver puts the vehicle in reverse. In this case a signal is automatically created at control unit 24 in response to automatic input 30 when the vehicle is put into reverse, which is transmitted to the trailer to prompt the video camera, or as the case may be some other sensor, into action in aider to alert the driver through notification device 6 about a possible hindrance at the rear of the vehicle.

The transmission or signals between notification device 6 and data collector 2 can be through analogue or digital signals. In an embodiment of the invention, an analogue transmission between first and second data sending/receiving units 4 and 5 is sufficient because of the short distance the signal must travel across the hitching space between the rear of the tractor and front of the trailer, especially when the units are aligned facing each other. Additionally, the structure of the tractor-trailer itself shields the wireless system against interference from comparable systems in nearby tractor-trailers given the weak signal strength, and therefore, no disruption is to be expected.

As previously described, the invention is designed for use with a bi-directional transmission process because data is preferably transmitted from data collectors 2 and 3 to notification device 6, as well as conversely from the notification device to the data collectors. In the event, however, that the attainment of an even simpler construction is desired in order to only transfer data from the trailer to the tractor, a unidirectional transmission can be designed with the advantage of reduced cost.

Through the short distance of the wireless transmission and the preferable use of infrared rays, it is assured that the wireless data transfer system according to the present invention when placed in one truck will not disturb another wireless data transfer system in another truck or likewise be disturbed by other such mechanisms.

In a preferred embodiment, a detection signal is sent between the wirelessly linked first and second communication units to continually check the transfer connection and ensure proper operation. This can, for example, be a signal sent regularly from one of units 4 or 5 that will be answered by the other of these units. Such a detection signal can be used in infrared transmitting, for example, to detect pollution, malfunctions of data sending and receiving mechanisms and, in the event of a faulty transmission, can request testing, exchange of the components, or cleaning of the infrared senders and receptors.

Summarized, the invention accomplishes the following: A tractor-trailer has a wireless data transfer system that consists of two communication unit separated and arranged in such a way that the unit in the tractor and the other in the trailer are facing each other. First communication unit 4 set in the trailer is connected via wires 7a and 7b with one or several data collectors 2 and 3. First communication unit 4 sends sensor data, such as camera images from the rear of the truck, preferably by an infrared ray, to communication unit 5 of the tractor, which then disperses this information to notification device 6, such as a video display, via wire 8. The wireless transmission path will be kept as short as possible with as low a signal strength as possible by the face-to-face arrangement of the communication units 4 and 5 across the hitching space. The system will be largely shielded from the outside by the truck body. By the preferable usage of an infrared ray with low signal strength, nearby trucks with similar equipment will not cause or receive interference. As a result, a fleet of trucks can be configured with identical wireless data transfer systems without requiring special security programming.

What is claimed is:

1. A wireless data transfer system for use in a tractor-trailer vehicle to wirelessly transmit data between the tractor and trailer to assist the driver in operating the vehicle, said system comprising:
    a first communication unit carried on a front side of said trailer adapted to wirelessly send and receive data using a low signal strength infrared ray beam;
    a second communication unit carried on a rear side of a tractor cab adapted to wirelessly send and receive data with said first communication unit using a low signal strength infrared ray beam;
    said front side of said trailer and rear side of said tractor cab being spaced apart when coupled together to define a hitching space between said tractor cab and said trailer which allows for relative pivotal movement between them; and,
    said first and second communication units aligned facing each other across said hitching space to define a communication gap within said hitching space over which data is wirelessly communicated between said first and second communication units, and wherein said low signal strength infrared ray beams are adapted to transmit data effectively only over distance of said communication gap;
    whereby data may be wirelessly transmitted between said first and second communication units using a low signal strength due to the proximity and alignment of the communication units to avoid interference with similar equipment in adjacent vehicles and to notify the driver about conditions surrounding the trailer.

2. The system of claim 1 including at least one data collector carried by said trailer in communication with said first communication unit, and said tractor cab including a notification device in communication with said second communication unit, whereby data collected by said at least one data collector is wirelessly communicated across said communication gap by said first and second communication units to said notification device to inform the driver as to the information obtained by said at least one data collector.

3. The system of claim 2 wherein said first and second communication units are detachably carried by their respective tractor and trailer, and said notification device and said at least one data collector are detachably carried on their respective tractor and trailer to provide a modular arrangement that may be retrofitted to existing tractor-trailer vehicles.

4. The system of claim 2 wherein said notification device is selected from the group consisting of a visual display mechanism, an acoustic warning mechanism, and a haptic warning mechanism for providing notice to the driver of conditions in and around said trailer.

5. The system of claim 2 wherein said at least one data collector is selected from the group consisting of a video camera, a radar sensor, an ultrasound sensor, and an infrared sensor for collecting information as to the conditions in and around said trailer.

6. The system of claim 2 including a control unit for generating a control signal in response to an input, said control signal being transmitted to said at least one data collector for actuating said data collector to transmit data to said notification device.

7. The system of claim 6 wherein said control signal is manually generated at the control unit in response to input from a driver in said tractor cab and transmitted across said communication gap by said communication units to said at least one data collector.

8. The system of claim 6 wherein said control signal is automatically generated at the control unit in said tractor cab in response to an event and transmitted across said communication gap by said communication units to said at least one data collector.

9. The system of claim 2 wherein said notification device is carried by a rear view mirror of said tractor.

10. A method for the wireless transfer of data between a tractor and a trailer of a tractor-trailer vehicle to assist the driver in operation of the vehicle, wherein said tractor and trailer are hitched together so that a front side of said trailer and a rear side of a tractor cab are spaced apart when coupled together to define a hitching space between said tractor cab and said trailer which allows for relative pivotal movement between them; said method comprising the steps of:

mounting a first communication unit to said front side of said trailer adapted to wirelessly send and receive data using a low signal strength infrared ray beam;

mounting a second communication unit to said rear side of said tractor cab adapted to wirelessly send and receive data with said first communication unit using a low signal strength infrared ray beam; and, aligning said first and second communication units to face each other across said hitching space when said tractor and trailer are coupled together to define a communication gap within said hitching space over which data is wirelessly communicated between said first and second communication units, and wherein said low signal strength infrared ray beams are adapted to transmit data effectively only over the distance of said communication gap;

whereby data may be wirelessly transmitted between said first and second communication units using a low signal strength due to the proximity and alignment of the communication units to avoid interference with similar equipment in adjacent vehicles and notify the driver about conditions surrounding the trailer.

11. The method of claim 10 including the steps of providing at least one data collector associated with said trailer in communication with said first communication unit, and providing a notification device associated with said tractor cab in communication with said second communication unit, whereby data collected by said at least one data collector is wirelessly communicated across said communication gap by said first and second communication units to said notification device to inform the driver of conditions in and around said trailer.

12. The method of claim 11 including the steps of generating a control signal and transmitting said control signal from said tractor to said at least one data collector in said trailer via said communication units for actuating said data collector to transmit data to said notification device.

13. The method of claim 10 including the step of performing a self-diagnosis of said first and second communication units by generating a detection signal and transmitting said detection signal between said first and second communication units at a regular predetermined interval to test for proper sending and receiving of said low signal strength infrared ray beams so that degradation of the signal strength resulting from pollution on said first and second communication units that interferes with said infrared ray beams is detected.

* * * * *